United States Patent [19]

Biesterfeldt

[11] Patent Number: 5,572,719
[45] Date of Patent: Nov. 5, 1996

[54] CLOCK CONTROL SYSTEM FOR MICROPROCESSORS INCLUDING A DELAY SENSING CIRCUIT

[75] Inventor: Randall P. Biesterfeldt, Austin, Tex.

[73] Assignee: Advanced Micro Devices, Sunnyvale, Calif.

[21] Appl. No.: 343,646

[22] Filed: Nov. 22, 1994

[51] Int. Cl.$^6$ ................................................ G06F 1/08
[52] U.S. Cl. ........................................ 395/555; 395/557
[58] Field of Search ................................................ 395/550

[56] References Cited

U.S. PATENT DOCUMENTS

| | | | |
|---|---|---|---|
| 5,059,818 | 10/1991 | Witt et al. | 307/269 |
| 5,077,686 | 12/1991 | Rubinstein | 395/550 |
| 5,118,975 | 6/1992 | Hillis et al. | 307/602 |
| 5,345,449 | 9/1994 | Buckingham et al. | 307/100.1 |
| 5,422,835 | 6/1995 | Houle et al. | 365/703 |
| 5,451,892 | 9/1995 | Bailey | 327/113 |
| 5,490,059 | 2/1996 | Mahalingaiah et al. | 364/166 |

*Primary Examiner*—Thomas M. Heckler
*Attorney, Agent, or Firm*—Conley, Rose & Tayon; B. Noel Kivlin

[57] ABSTRACT

A microprocessor includes a clock control system for varying its internal processor clock frequency. The clock control system includes a delay chain composed of delay elements. A set of tap points are distributed at the outputs of selected delay elements. Each tap point is coupled to a respective input line of a latch unit. During operation, an external clock generator provides a clock signal to an input of the delay chain. As a particular rising or falling edge of the clock signal propagates through the delay chain, corresponding signal transitions sequentially appear at the tap points. The latch unit stores the signals in response to a subsequent rising or falling edge of the external clock signal. Thus, an output of the latch unit is indicative of a delay associated with the microprocessor. A decoding circuit may be provided to decode the output of the latch unit and to provide an input to a clock switching circuit which controls the frequency of an internal clock signal. If a high propagation delay exists, the frequency of the internal clock is decreased. If a low propagation delay exists, the frequency is increased.

20 Claims, 7 Drawing Sheets

CLOCK CONTROL SYSTEM FOR MICROPROCESSORS INCLUDING A DELAY SENSING CIRCUIT

BACKGROUND OF THE INVENTION

1. Field of the Invention

This invention relates generally to computer systems and more particularly to clock control techniques for microprocessors. The invention also relates to the measurement of propagation delays within microprocessors.

2. Description of the Relevant Art

Microprocessors or central processing units (referred to herein as "processors" or "CPU's") are typically capable of operating at much higher frequencies than the frequency at which they are actually set to operate. That is, since a processor in a computer system must allow for a worst case scenario of operating conditions, the processor is typically set to operate at a frequency lower than its actual maximum operating frequency during normal conditions. In general, unfavorable operating conditions of the processor chip may cause an increase in the time required for a particular signal to propagate through a designated portion of the microprocessor circuitry. Therefore, in order to maintain proper operation of the computer system at all times, manufacturers rate a particular processor for certain predetermined worst case conditions, and specify the maximum operating frequency based on these worst case conditions.

Thus, for example, a 33 MHz rated processor may potentially be operable at a higher frequency, such as 49.5 MHz, during favorable operating conditions. The processor, however, will not be driven at 49.5 MHz in practice because the operating conditions may not always be favorable. If the processor were driven at 49.5 MHz, failures could occur during the periods of less favorable operating conditions.

Figure 1A:
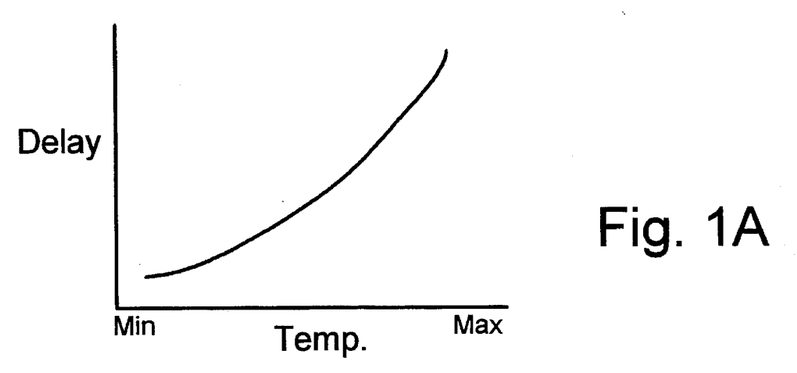
FIGS. 1A–1C are a set of graphs which depict typical relationships between the propagation delay associated with internal circuitry of a microprocessor and temperature, voltage, and process variations.
Figure 1B:
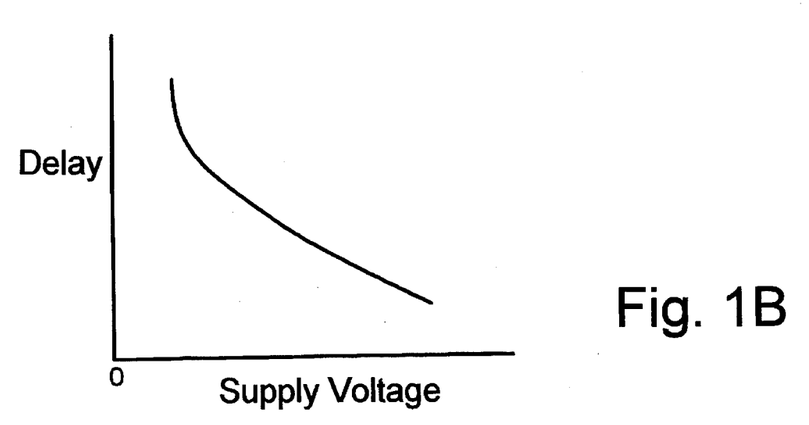
Figure 1C:
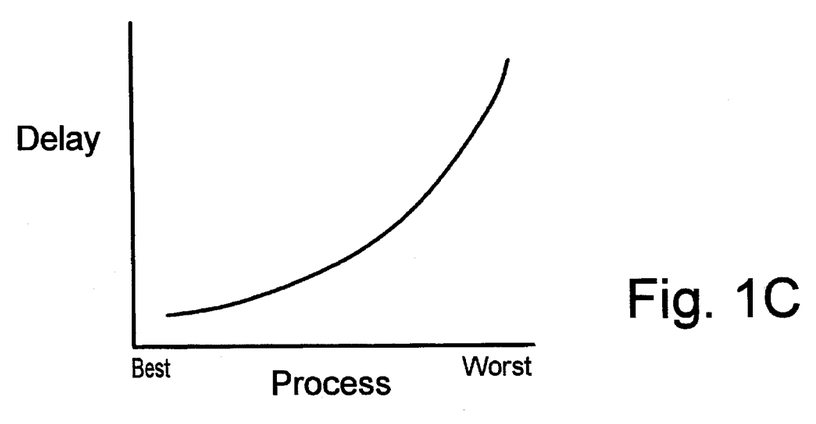

Exemplary parameters that can affect the propagation delays associated with a processor include temperature, supply voltage levels, and manufacturing variations. FIGS. 1A–1C are graphs which illustrate general relationships between these parameters and propagation delay. Referring first to FIG. 1A, as the temperature of a processor increases, the propagation delays associated with the internal circuitry of that processor also typically increase. As illustrated in FIG. 1B, supply voltage levels can also affect propagation delays associated with a processor. Generally speaking, the lower the supply voltage to the processor, the greater the propagation delays. Processing variations may also impact propagation delays, as depicted in FIG. 1C. The maximum rated frequency of a processor is typically set to ensure operability when all delay-affecting parameters reach their worst case condition concurrently.

With computing speed and performance a premium in today's market, a need exists for a processor that is configured to operate at an optimal frequency based on the current operating conditions of the processor.

SUMMARY OF THE INVENTION

The problems outlined above are in large part solved by a processor clock control system which includes a circuit that continuously or periodically measures a related propagation delay in the processor without resorting to direct measurement of external factors indicative of delay, such as temperature. Upon obtaining this measurement, the internal processor clock frequency is increased or decreased.

In one embodiment, a microprocessor includes a delay sensing circuit coupled to a clock switching circuit. The delay sensing circuit includes a delay chain having a plurality of serially connected delay elements. A set of tap points are distributed along the delay chain at the outputs of selected delay elements. Each tap point is coupled to a respective input line of a latch unit through a buffer unit. During operation of the processor, an external clock generator provides a clock signal, which is preferably associated with a stable frequency characteristic, to an input of the delay chain. The clock signal serially propagates through each delay element within the delay chain. As a particular rising or falling edge of the clock signal propagates through the delay chain, corresponding signal transitions sequentially appear at the tap points. The latch unit stores the signals at the delay chain tap points in response to a subsequent rising or falling edge of the external clock signal. Thus, an output of the latch unit is indicative of how far a particular edge of the clock signal propagated through the delay chain during a given period, and is thus indicative of a related delay associated with the microprocessor. A decoding circuit may be provided to decode the output of the latch unit and to provide an input to a clock switching circuit which controls the frequency of an internal clock signal to the processor core. If a high propagation delay is detected, the frequency of the internal processor clock is decreased. Likewise, if a low propagation delay is detected, the frequency of the internal clock is increased.

A processor clock control system according to the present invention advantageously allows dynamic control of the internal clock frequency of a processor to account for variations in propagation delays. During periods of favorable operating conditions, the internal clock frequency will be increased. Similarly, during periods of less favorable operating conditions, the internal clock frequency will be decreased. Accordingly, an improvement in the performance of the processor may be attained during favorable operating conditions while avoiding processor failures during less favorable operating conditions.

Broadly speaking, the invention contemplates a microprocessor comprising a processor core capable of executing a predetermined instruction set and a clock switching circuit coupled to a processor core, wherein a clock switching circuit is configured to provide an internal clock signal to a processor core, and wherein a clock switching circuit is capable of selectively varying a frequency of an internal clock signal based on a control signal. A delay sensing circuit is also provided coupled to a clock switching circuit, wherein a delay sensing circuit is configured to generate a control signal dependent upon an extent of propagation of an external clock signal through a delay sensing circuit.

The invention also contemplates a method for dynamically changing a frequency of an internal microprocessor clock signal comprising the steps of generating an external clock signal, providing said external clock signal to a delay sensing circuit, and determining an extent of propagation of said external clock signal through said delay sensing circuit. The method also comprises changing the frequency of said internal microprocessor clock based on the determination in step c.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
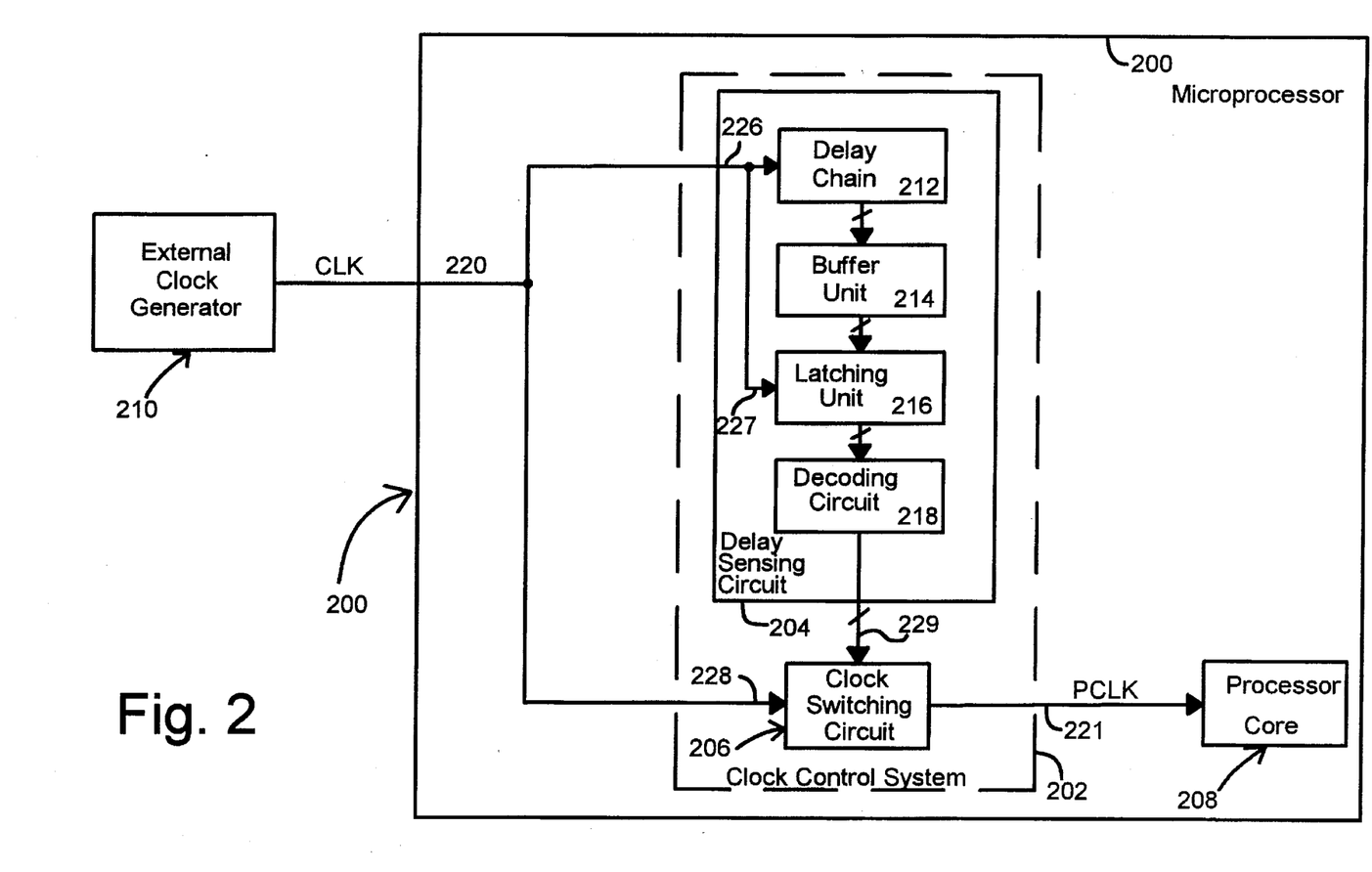
FIG. 2 is a block diagram of a microprocessor including a clock control system which provides an internal clock signal to a processor core.

Turning next to FIG. 2, a microprocessor 200 including a clock control system 202 in accordance with one embodiment of the present invention is shown. The clock control system 202 includes a delay sensing circuit 204 coupled to a clock switching circuit 206. The clock switching circuit 206 is connected to a processor core 208. An external clock generator 210 is finally shown coupled to the delay sensing circuit 204 and to the clock switching circuit 206.

The external clock generator 210 preferably includes a crystal oscillator circuit to generate an external clock signal (CLK) at line 220. As will be appreciated to those of skill in the art, a crystal oscillator circuit is typically associated with an output signal having very stable frequency characteristics with respect to variations in both temperature and source voltage.

Processor core 208 is a processing unit that implements a predetermined instruction set. Exemplary processor cores include model 80386 and model 80486 processor cores. It is understood, however, that a clock control system in accordance with the present invention may be employed in conjunction with other processor cores that implement alternative instruction sets.

Delay sensing circuit 204 includes a delay chain 212 coupled to a buffer unit 214. A set of output lines of buffer unit 214 is coupled to a latching unit 216, and a set of output lines of the latching unit 216 is coupled to a decoding circuit 218.

In the illustrated embodiment, clock switching circuit 206 receives the external clock signal at line 220, selectively varies the frequency of that signal, and provides an internal processor clock (PCLK) at line 221 which is used to drive internal circuitry of processor core 208.

As will be explained in greater detail below, delay chain 212 may include a plurality of serially connected delay elements. The delay chain 212 is included as an integral portion of the microprocessor 200 and, therefore, is affected by variations in operating conditions such as temperature, source voltage, and process in a manner which is similar to their corresponding affects upon the internal circuitry of processor core 208.

Generally speaking, during operation of microprocessor 200, the external clock generator 210 provides a clock signal CLK at line 220. This external clock signal is received at an input line 226 of delay chain 212, at a control line 227 of latching unit 216, and at an input line 228 of the clock switching circuit 206. The delay sensing circuit 204 generates a control signal which is indicative of a relative propagation delay associated with delay chain 212 at a set of control lines 229. This control signal is provided to clock switching circuit 206 which selectively varies the frequency of the internal processor clock signal PCLK at line 221 depending upon the specific value (or state) of the control signal. Further details regarding implementations of delay sensing circuit 204 including delay chain 212, buffer unit 214, latching unit 216, and decoding circuit 218 are provided below.

Figure 3:
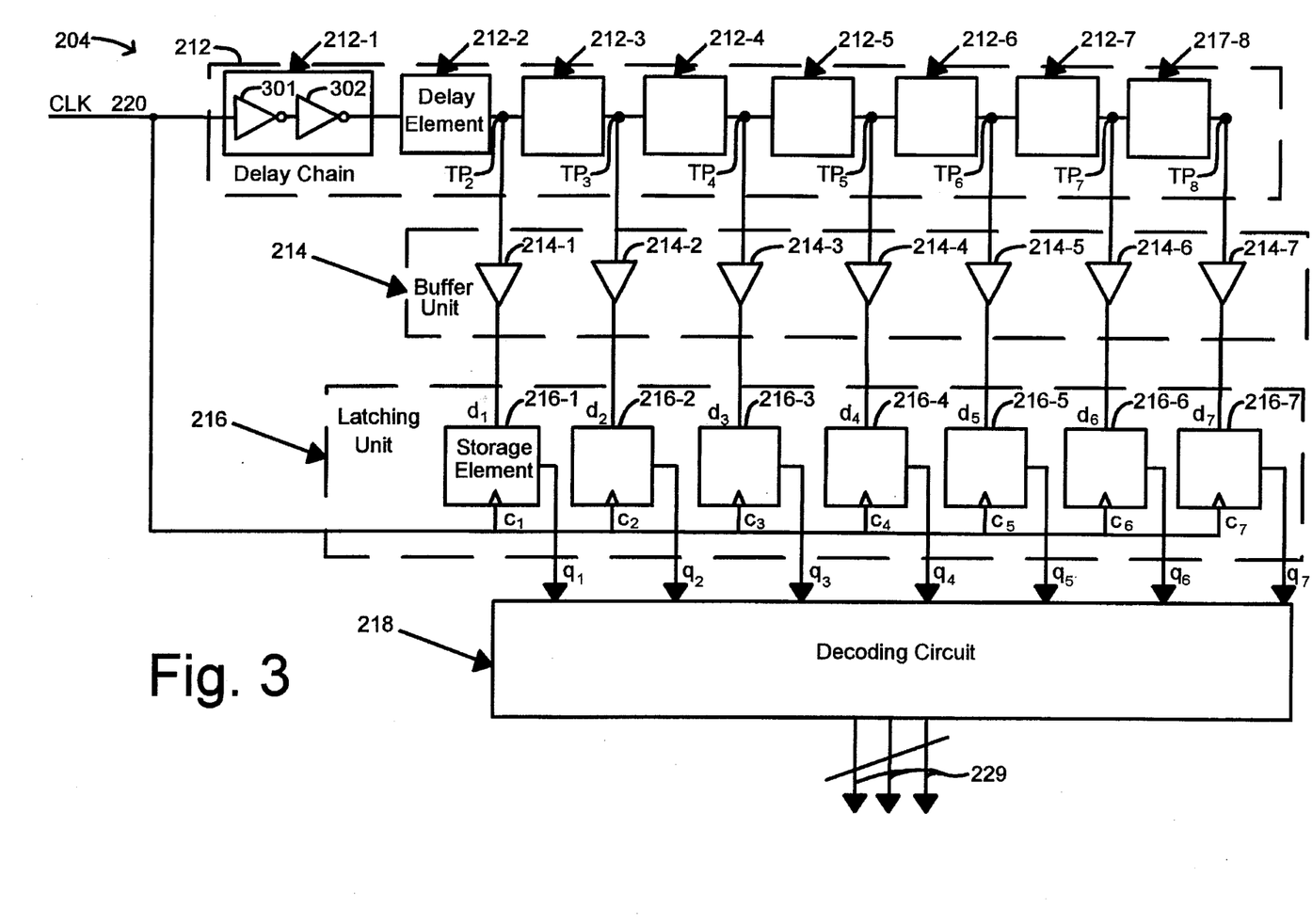
FIG. 3 is a block diagram of one implementation of a delay sensing circuit of FIG. 2.

FIG. 3 is a block diagram which illustrates one implementation of the delay sensing circuit 204 of FIG. 2. Circuit portions that correspond to those of FIG. 2 are numbered identically for simplicity and clarity. As illustrated in the figures, this particular implementation includes delay chain 212 coupled through buffer unit 214 to latching unit 216. The latching unit 216 is coupled to decoding circuit 218 which provides a control signal at lines 229 to the clock switching circuit 206 (i.e., of FIG. 2).

Delay chain 212 includes a plurality of serially connected delay elements 212-1 through 212-8. The output lines of selected delay elements 212-x are tapped at tap points $TP_2$–$TP_8$ to provide respective tap signals to latching unit 216 through buffer unit 214. The delay elements preferably have substantially equal delay characteristics. As schematically illustrated within the delay element 212-1, each delay element 212-x may be implemented as a pair of serially connected inverters 301, 302. It will be appreciated that other delay circuits may be employed to perform similar signal-delaying functions, and that the specific form of the delay elements 212-x may be varied without departing from the spirit and scope of the present invention. It is also noted that delay element 212-1 in the embodiment of FIG. 3 is provided to allow for the set-up time of latching unit 216. Depending upon the particular configuration, greater or less delay may be provided to properly accomodate the set-up time of latching unit 216.

Buffer unit 214 includes a plurality of buffer elements 214-1 through 214-7 which receive respective signals at tap points ($TP_2$–$TP_8$). The tap point signals are coupled to respective input lines of latching unit 216 through buffer unit 214. It is understood that for certain implementations, delay sensing circuit 204 could be alternatively configured such that the tap points $TP_2$–$TP_8$ are coupled directly to latch unit 216. In such configurations, buffer unit 214 may be omitted.

Latching unit 216 includes a plurality of storage elements 216-1 through 216-7. In this implementation, the storage elements 216-x are positive edge triggered D flip-flops. As will be readily understood, each flip-flop includes an input line ($d_1$–$d_7$), a clock (or control) line ($C_1$–$C_7$), and an output line ($q_1$–$q_7$). Each input line $d_x$ is connected to a respective output line of buffer unit 214. Each clock line $C_x$ is coupled to receive the external clock signal (CLK) at line 220. The output lines $q_x$ are coupled to decoding circuit 218.

Figure 4:
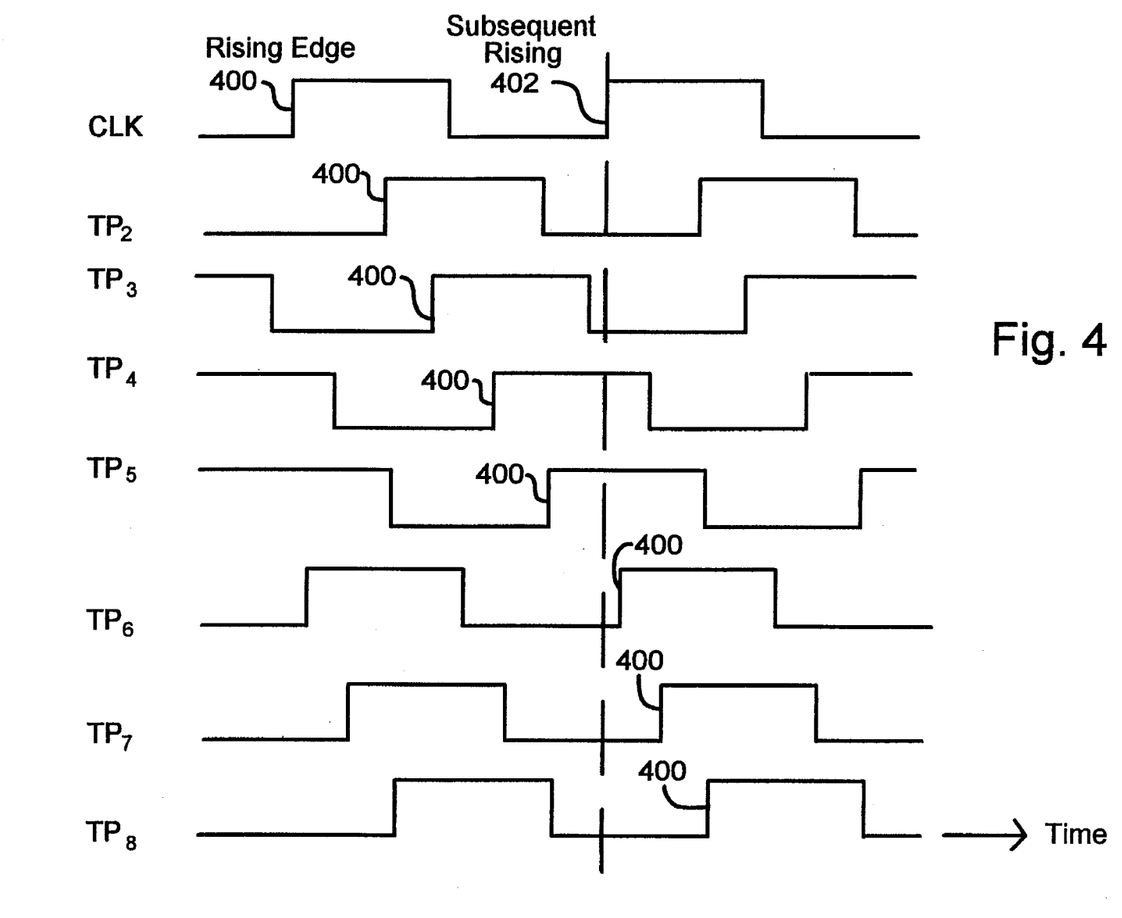
FIG. 4 is a timing diagram which illustrates a signal state of each tap point within a delay chain as a rising edge of the external clock signal propagates through the delay chain.

The operation of delay sensing circuit 204 is next considered in conjunction with FIG. 4. FIG. 4 is a timing diagram which illustrates the signal state of each tap point $TP_2$–$TP_8$ as a rising edge of the external clock signal propagates through the delay chain 212. Referring collectively to FIGS. 3 and 4, when a particular rising edge 400 of the external clock signal enters the delay chain 212, it propagates through delay element 212-1 and delay element 212-2 to the point $TP_2$. Thereafter, it propagates in order through the remaining delay elements 212-3 through 212-8. As illustrated in FIG. 4, a signal transition which corresponds to the rising edge 400 appears first (in time) at the tap point TP2, then at the tap point $TP_3$, and so on. As illustrated in FIG. 3, the signals at the tap points $TP_x$ are driven through buffer unit 214 to respective inputs of latching unit 216. Upon the occurrence of a subsequent rising edge 402 of the external clock signal (CLK) at line 220, the latching unit 216 latches the signal states of the tap points $TP_x$. The output lines $q_x$ of storage elements 216-x are thus driven to reflect the states of the tap points $TP_x$ when the subsequent rising edge appears at line 220. It will be appreciated that the output signal from latching unit 216 is indicative of a relative propagation delay associated with delay chain 212. Decoding circuit 218 decodes the output signals from latching unit 216 and generates a control signal at lines 229 which is also indicative of the relative delay associated with the delay chain 312. It is also noted that, depending upon the particular configuration of clock switching circuit 206, decoding circuit 218 may be unnecessary. Referring back to FIG. 2, the clock switching circuit 206 receives the control signal at lines 229 and controls the frequency of the internal clock signal (PCLK) to the processor core 208 depending upon the specific state of the control signal.

As is illustrated in FIG. 4, the rising edge 400 of the external clock signal (CLK) propagated through five of the delay elements (i.e., 212-1 through 212-5) in the delay chain 212 at the point when the next rising edge transition 402 occurred in the external clock signal CLK at line 220. This is illustrated by the highest-order tap point $TP_x$ which is logically high at the time when the next rising edge 402 occurs. Additional rising edges in the external clock signal (following rising edge 402) result in similar outputs from latching unit 216. It is noted that the logical state of each tap point $TP_x$ upon the occurrence of each rising edge is temporarily stored and provided as an output signal from the respective storage elements 216-x, and that the output from latching unit 216 is iteratively updated upon each rising edge.

Figure 5:
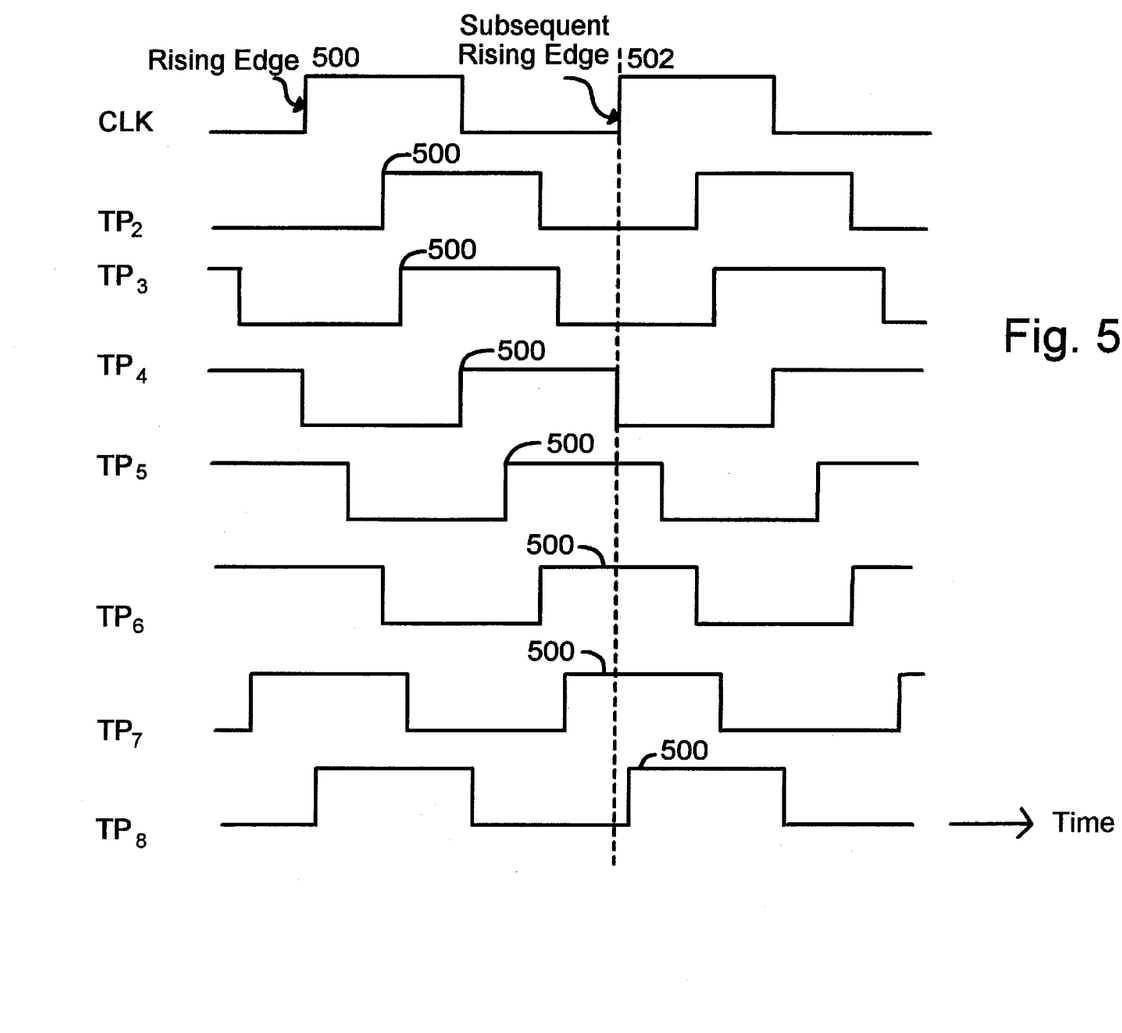
FIG. 5 is a timing diagram which illustrates the signal state of each tap point within the delay chain as a rising edge of the external clock signal propagates through the delay chain during a period of more favorable operating conditions in comparison to that of FIG. 4.

As the propagation delays associated with the internal circuitry of processor core 208 change in response to, for example, temperature, supply voltage, and/or process variations, the propagation delays associated with the delay elements 212-1 through 212-8 will change similarly. FIG. 5 is a timing diagram which illustrates the signal state of each tap point $TP_2$–$TP_8$ as a rising edge of the external clock signal propagates through the delay chain 212 when more favorable operating conditions exist in comparison to those of the situation of FIG. 4. As illustrated in FIG. 5, a given rising edge 500 of the external clock signal (CLK) propagates through seven delay elements (i.e., 212-1 through 212-7) of the delay chain 212 upon the occurrence of a next rising edge 502 of the external clock signal CLK. Once again, this is evidenced by the highest-order tap-point $TP_x$ with a logically high state, which is for this situation, $TP_7$. The logical states of the tap points $TP_x$ upon the occurrence of the next rising edge 502 for this particular period will again be reflected within the stored output signal from latching unit 216. Since the rising edge 500 of the external clock signal propagated through more of the delay elements 212-x for the situation of FIG. 5 in comparison to that of FIG. 4, a longer relative propagation delay is associated with the operating conditions during the situation of FIG. 4. Accordingly, clock switching circuit 228 causes the frequency of the internal clock signal PCLK to processor core 208 to be raised during situations when the operating conditions are more favorable, such as in the situation of FIG. 5. That is, if the delay sensing circuit 204 generates a control signal which indicates relatively short propagation delays, the frequency of the internal clock signal PCLK is set relatively high. Likewise, if delay sensing circuit 204 generates a control signal which indicates relatively long propagation delays, the frequency of the internal clock signal PCLK is set relatively low. Since an updated control signal at lines 229 is generated by the delay sensing circuit 204 every period of the external clock signal at line 220, the frequency of the internal clock signal PCLK is dynamically varied throughout the operation of the microprocessor 200 depending upon current operating conditions.

Figure 6:
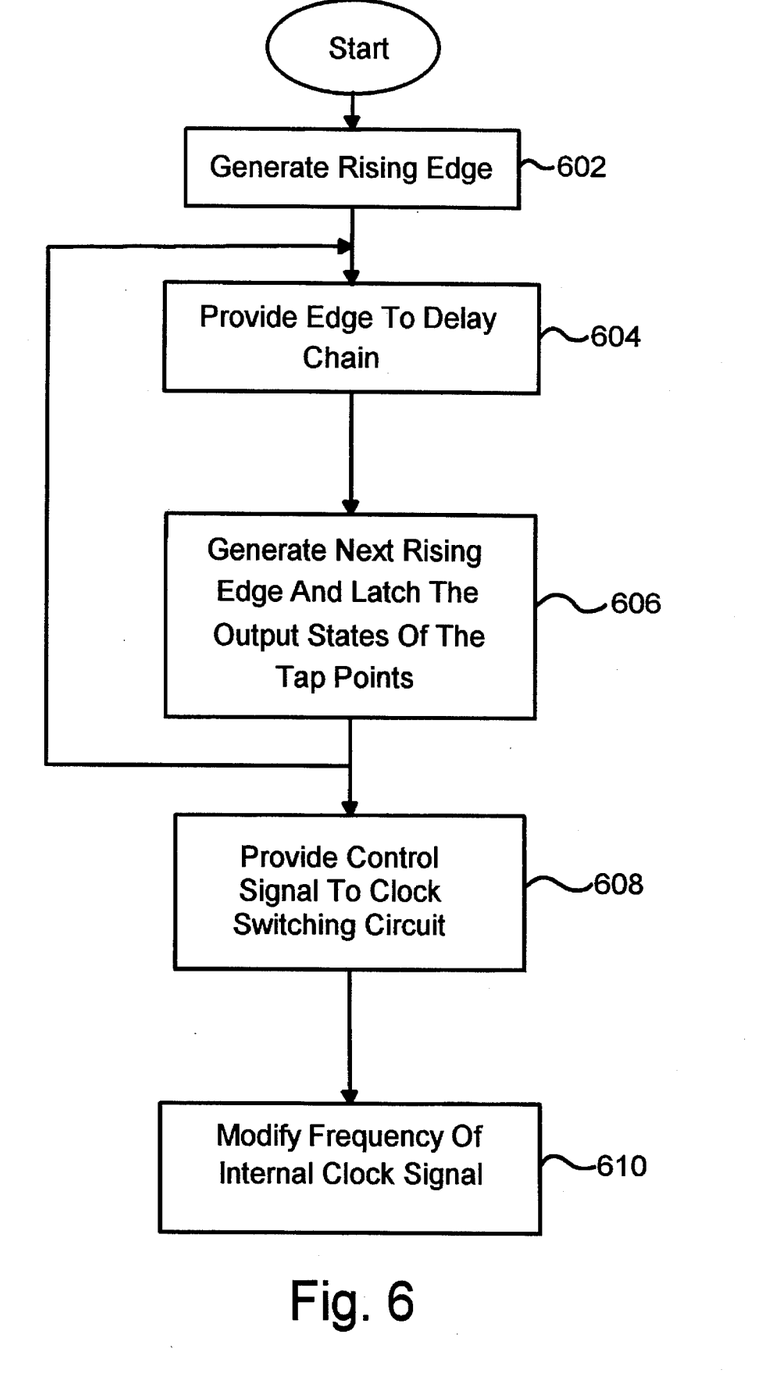
FIG. 6 is a flow diagram illustrating a method for controlling the frequency of a processor clock signal based on a relative propagation delay associated with the processor.
Figure 7:
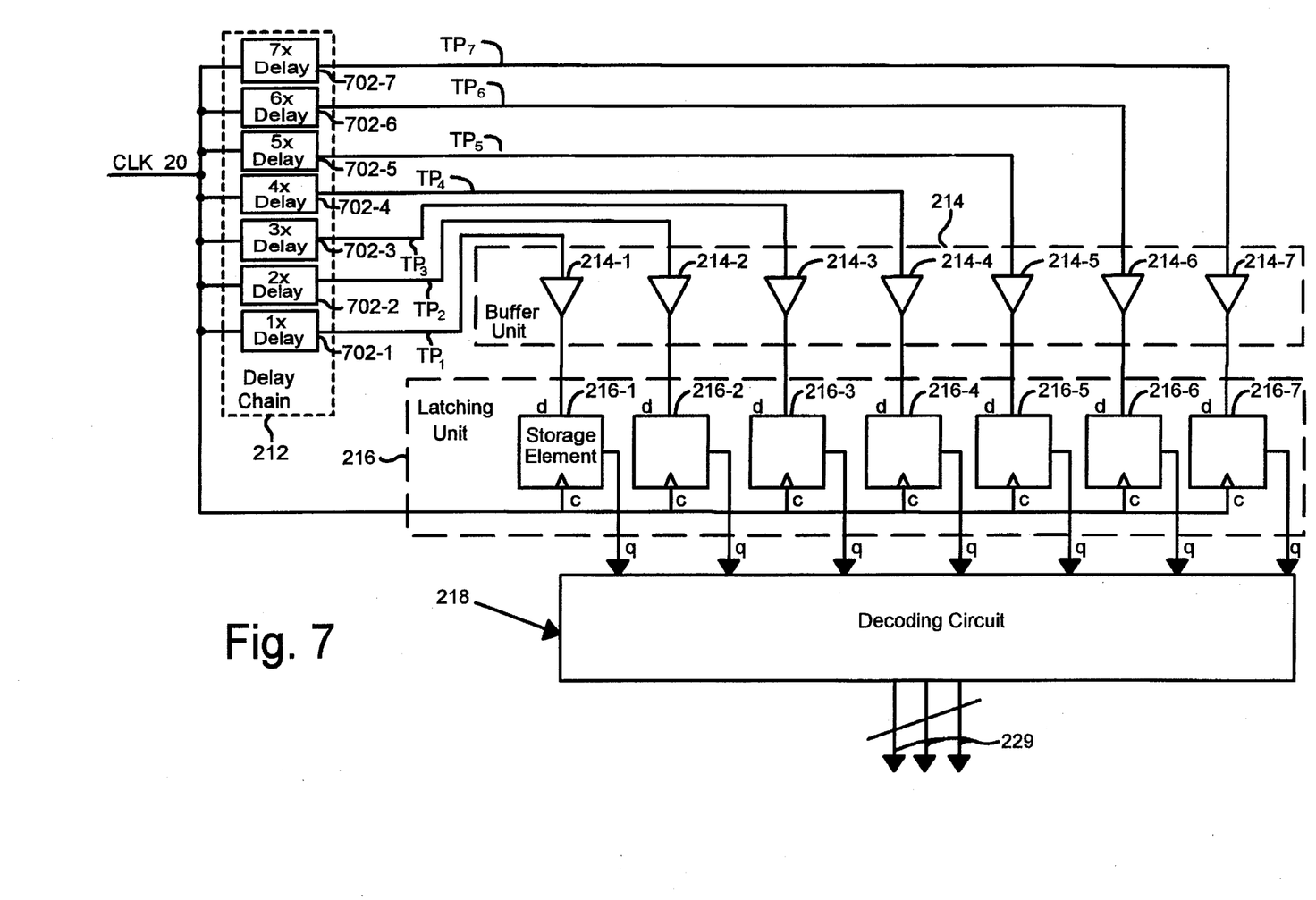
FIG. 7 is a block diagram of a second implementation of a delay sensing circuit.

FIG. 6 is a flow diagram which depicts general operational steps associated with the clock control system of FIG. 2. Referring collectively to FIGS. 2 and 7, a rising edge of the external clock signal CLK is generated during step 602 and is provided to the delay chain 212 as illustrated by step 604. Upon generation of a subsequent rising edge of the external clock signal during step 606, the states of the tap points TP are latched. As stated previously, this latched signal condition is indicative of how far the rising edge propagated through the delay chain during a predetermined period, and is thus indicative of the propagation delay associated with the delay chain. During step 608 the latched signal states of the tap points are decoded, if necessary, to provide an appropriate control signal to which the clock switching circuit is responsive. The generated control signal thereafter causes the clock switching circuit 206 to increase or decrease the frequency of the internal processor clock signal (step 610). This process is continuously repeated upon the occurrence of each subsequent rising edge of the external clock signal.

It is noted that decoding circuit 218 may be implemented with combinational logic. In one implementation, decoding circuit 218 may be configured to detect the highest-order tap point signal which is logically high, as discussed previously. It is understood, however, that a variety of other specific configurations of decoding circuit 218 may be employed.

It is also understood that the specific delays associated with each delay element 212-x within delay chain 212, as well as the number of delay elements provided within the delay chain, depend upon the frequency of external clock signal CLK as well as upon the desired resolution in the relative propagation delay measurement.

It is finally understood that clock switching circuit 206 may be embodied in a variety of particular configurations. For example, the clock switching circuit 206 may include selectively enabled divider or multiplier circuitry which varies the frequency of the external clock signal CLK to thereby synthesize the internal clock signal PCLK having a frequency which is dependent upon the control signal at line 229. Clock switching circuit could alternatively receive several input clock signals having differing frequencies, and may include a multiplexer circuit which selectively routes one of the input clock signals through the clock switching circuit 206 and to the processor core 208. In addition, it is noted that although the external clock signal at line 220 in the embodiment of FIG. 2 is generated externally from the microprocessor 200, the input clock signal to clock switching circuit 206 may be provided from a source which is internal to microprocessor 200. Furthermore, although the same clock signal at line 220 is provided to both the delay sensing circuit 204 and to the clock switching circuit 206, separate clock signals could be provided to the respective circuits.

Referring next to FIG. 7, a block diagram is shown of an alternative embodiment of delay sensing circuit 204. Circuit portions that correspond to those of FIG. 3 are numbered identically for simplicity and clarity.

FIG. 7 illustrates an embodiment wherein delay chain 212 includes a plurality of delay elements 702-1 through 702-7 coupled to receive in parallel the external clock signal CLK. In contrast to the embodiment of FIG. 3, the delay elements 702-x of FIG. 7 are each configured with different relative propagation delays. That is, FIG. 7 illustrates the delay element 702-1 as a x1 delay, delay element 702-2 as a x2 delay, delay element 702-3 as a x3 delay, and so on. Similar to the embodiment of FIG. 3, a set of tap points $TP_1$–$TP_2$ are coupled from the delay chain to latching unit 227 through buffer unit 214.

The operation of the delay sensing circuit of FIG. 7 is similar to that of FIG. 3. In this embodiment, however, a particular rising edge of the external clock signal CLK will propagate completely through some of the delay elements 702-x upon the occurrence of a subsequent rising edge of the external clock signal CLK. The particular number of delay elements through which the rising edge will completely propagate is dependent upon the operating conditions existing at that particular time. Thus, similar to the embodiment of FIG. 3, the output signal of latching unit 216 is indicative of a relative propagation delay of the microprocessor circuitry.

While a preferred and alternative embodiment of the present invention has been described, with respect to certain preferred embodiments, it should be apparent to those skilled in the art that it is not so limited. Various other modifications may be made without departing from the spirit and scope of the invention. It is intended that the following claims be interpreted to embrace all such variations and modifications.

What is claimed is:

1. A microprocessor comprising:
   a processor core configured to execute a predetermined instruction set;
   a clock switching circuit coupled to said processor core, wherein said clock switching circuit is configured to provide an internal clock signal to said processor core, and wherein said clock switching circuit is configured to selectively vary a frequency of said internal clock signal based on a control signal; and
   a delay sensing circuit coupled to said clock switching circuit, wherein said delay sensing circuit is configured to generate said control signal dependent upon an extent of propagation of a given clock signal through said delay sensing circuit.

2. The microprocessor as recited in claim 1 wherein said delay sensing circuit includes a plurality of serially connected delay elements, wherein a set of tap points are interposed at predetermined locations along said plurality of serially connected delay elements, and wherein said control signal is derived from signals at said set of tap points.

3. The microprocessor as recited in claim 2 further comprising a latching unit coupled to receive said signals at said set of tap points, wherein an output signal of said latching unit is indicative of a propagation delay associated with said delay chain.

4. The microprocessor as recited in claim 3 wherein said delay sensing circuit further comprises a decoding circuit coupled between said latching circuit and said clock switching circuit, wherein said decoding circuit decodes the output signal of said latching unit to derive said control signal.

5. The microprocessor as recited in claim 4 wherein said latching unit includes a plurality of flip-flop circuits coupled to said tap points.

6. The microprocessor as recited in claim 4 wherein said delay sensing circuit is configured to generate said control signal dependent upon said extent of propagation of a single clock cycle of said given clock signal through said delay sensing circuit, and wherein said external clock signal is provided to a control input of said latching unit, wherein said latching unit latches said tap point signals in response to a first edge of said given clock signal following said single clock cycle.

7. The microprocessor as recited in claim 2 wherein said delay sensing circuit includes a plurality of delay elements, wherein said plurality of delay elements are coupled to receive said given clock signal in parallel.

8. The microprocessor as recited in claim 7 wherein an input line of each of said plurality of delay elements is coupled to receive said given clock signal, and wherein a set of tap points are coupled to respective output line to said plurality of delay elements, and wherein said control signal is derived from signals at said set of tap points.

9. The microprocessor as recited in claim 2 wherein a delay element of said plurality of serially connected delay elements includes a plurality of serially connected inverters.

10. The microprocessor as recited in claim 2 wherein each of said plurality of serially connected delay elements is associated with a substantially equal delay characteristic.

11. A clock control circuit for a microprocessor, wherein said microprocessor includes a processor core configured to execute a predetermined instruction set, said clock control circuit comprising:
    a clock switching circuit coupled to said processor core for providing an internal clock signal to said processor core, wherein said clock switching circuit is configured to selectively vary a frequency of said internal clock signal based on a control signal; and
    a delay sensing circuit coupled to said clock switching circuit, wherein said delay sensing circuit is configured to generate said control signal dependent upon an extent of propagation of an external clock signal through said delay sensing circuit.

12. The clock control circuit as recited in claim 11 wherein said delay sensing circuit includes a plurality of serially connected delay elements, wherein a set of tap points are interposed at predetermined locations along said plurality of serially connected delay elements, and wherein said control signal is derived from signals at said set of tap points.

13. The clock control circuit as recited in claim 12 further comprising a latching unit coupled to receive said signals at said set of tap points, wherein an output signal of said latching unit is indicative of a relative propagation delay associated with said delay chain.

14. The clock control circuit as recited in claim 13 wherein said delay sensing circuit further comprises a decoding circuit coupled between said latching circuit and said clock switching circuit, wherein said decoding circuit decodes the output signal of said latching unit to derive said control signal.

15. The clock control circuit as recited in claim 14 wherein said latching unit includes a plurality of flip-flop circuits coupled to said tap points.

16. The clock control circuit as recited in claim 14 wherein said external clock signal is provided to a control input of said latching unit, wherein said latching unit latches said tap point signals in response to an edge of said external clock signal.

17. The clock control circuit as recited in claim 12 wherein a delay element of said plurality of serially connected delay elements includes a pair of serially connected inverters.

18. The clock control circuit as recited in claim 12 wherein each of said plurality of serially connected delay elements is associated with a substantially equal delay characteristic.

19. A method for dynamically changing a frequency of an internal microprocessor clock signal comprising the steps of:

a) generating a given clock signal of a predetermined frequency;

b) providing said given clock signal to a delay sensing circuit;

c) determining an extent of propagation of said given clock signal through said delay sensing circuit; and d) changing the frequency of said internal microprocessor clock signal based on the determination in step c.

20. The method as recited in claim 19 comprising the further step of latching a signal state of a set of tap points associated with said delay sensing circuit in response to an edge of said given clock signal.

* * * * *